Figures 1, 2:
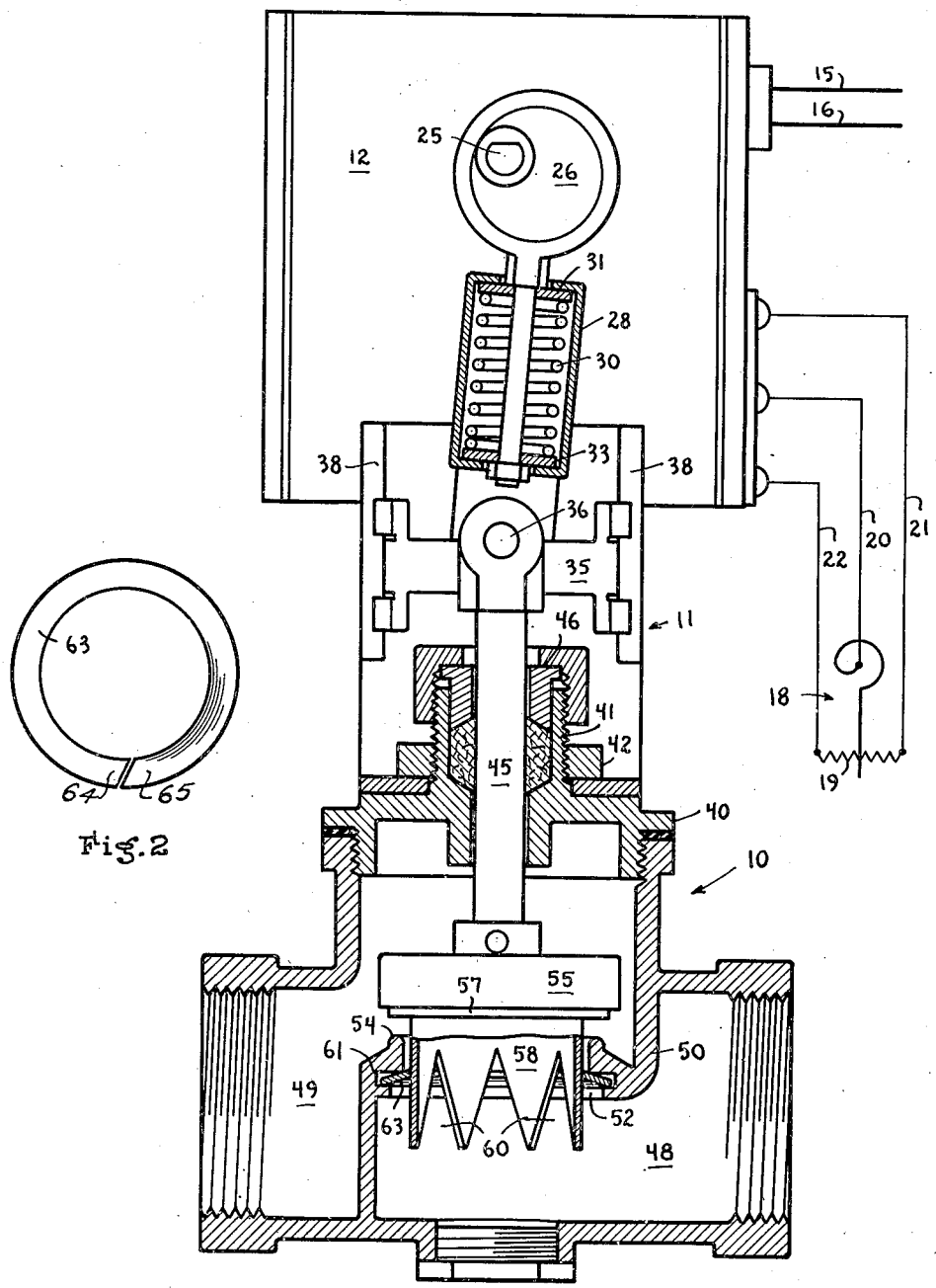

Dec. 14, 1943.     D. G. TAYLOR     2,336,653
VALVE
Filed Feb. 6, 1942

INVENTOR
Daniel G. Taylor
BY George H. Fisher
ATTORNEY

Patented Dec. 14, 1943

2,336,653

UNITED STATES PATENT OFFICE 2,336,653

VALVE

Daniel G. Taylor, Minneapolis, Minn., assignor to Minneapolis-Honeywell Regulator Company, Minneapolis, Minn., a corporation of Delaware Application February 6, 1942, Serial No. 429,741

5 Claims. (Cl. 251—34)

The present invention relates to the construction of valves and is particularly directed to the actual valving means.

Considerable difficulty is sometimes experienced with valves due to their tendency to rattle, vibrate, and cause various unpleasant sounds. This tendency is especially noticeable in valves employing guides or characterized skirts and is most pronounced when the valve is only slightly open. It is caused by high fluid velocities through restricted areas.

It is an object of the invention, therefore, to provide a valve which will not vibrate as a result of fluid flow therethrough.

Another object of the invention is the provision of a valve in which vibration is prevented by frictional means acting between the stationary and movable parts of the valve.

Another object is the provision of a globe valve in which frictional damping means is introduced between the valve opening and the valve disc skirt.

Another object is to provide a valve in which a resilient member cooperates with a characterized valve skirt to determine the flow through the valve.

A further object of the invention is the provision of a valve having a groove cut in the periphery of the valve opening to receive a conical ring which resiliently engages the top and bottom of the groove as well as the valve disc skirt or guides to dampen out any tendency of the valve to vibrate, and which may also cooperate with the valve skirt in determining valve opening.

Other objects will appear in this specification taken together with the drawing in which:

Figure 1 shows a modulating valve incorporating the various features of the invention, and Figure 2 shows a plan view of the resilient ring which is shown in section in Figure 1.

In valves for modulating the flow of fluid, it is common to provide the skirt with V ports or other characterized shape to compensate for the non-linear relation between valve opening and fluid flow. This skirt cooperates with the valve opening to regulate the flow. It is necessary to provide considerable clearance between the skirt and the opening to compensate for manufacturing variations, misalignment of the parts, corrosion, etc., and this clearance reduces the accuracy of flow control especially at low flow positions of the valve. In the present arrangement a flexible member is placed between the valve opening and the skirt to largely eliminate the clearance above referred to. This same flexible member is employed to dampen out vibration of the valve.

Referring to Figure 1 of the drawing, a valve body 10 is shown in section and has attached thereto a valve operating linkage 11 on the top of which is mounted a modulating electric motor 12. The motor 12 is supplied with electric power through the line wires 15 and 16 and is modulated to various positions according to the temperature existing at a thermostat 18. As the temperature varies the thermostat positions a potentiometer 19 to vary the relative resistance between a control wire 20 and wires 21 and 22, respectively.

Changes in temperature at the thermostat 18 result in positioning of a motor shaft 25 on which is mounted an eccentric 26. The motor positions the valve through the linkage 11 which includes a strain release 28. In the position shown, the valve is in partly opened position and the strain release mechanism is therefore inoperative. When the valve is closed and the motor shaft 25 further rotated slightly in a clockwise direction, the eccentric 26 will compress a spring 30 through a disc 31 both of which are included in the strain release 28. Likewise, if the valve is completely opened and the motor is run in a counter-clockwise direction the spring 30 will be compressed through a disc 33.

The strain release mechanism 28 operates to position a cross-head 35 and is pivoted thereto at 36. The cross-head 35 is supported laterally in suitable guides 38.

The linkage 11 is secured to a valve cap 40 mounted on the top of the body of valve 10. The valve cap 40 has a threaded upper extension 41 while a nut 42 engages the threaded portion 41, serving to join the linkage 11 and the valve body 10.

A valve stem 45 passes through a packing gland 46 carried in the threaded portion 41 of the valve cap 40. The stem 45 is pivoted at its upper end to the cross-head 35.

The valve 10 includes an inlet chamber 48, an outlet chamber 49 and a partition 50 which separates the two chambers. The partition 50 is provided with an opening 52 therethrough and a valve seat 54 surrounding this opening. To the lower end of the valve stem 45 is secured a valve member or disc 55, the lower surface of which comprises resilient material 57 to insure a tight shut-off on engagement with the seat 54. The valve illustrated is of the V port type and includes a cylindrical skirt 58 mounted on the bottom of the valve disc 55 and passing through the opening 52 in the partition 50. The skirt 58 as shown is provided with configurated openings in the form of V shaped notches 60 but may be provided with openings of any desired shape to give the flow characteristics desired. The skirt 58 also serves as the lower guide for the valve stem 45 and disc 55.

The opening 52 in the partition 50 is provided with an annular groove 61 which is adapted to receive a split ring 63, having overlapping ends, 64 and 65. A plan view of the ring 63 is shown in Figure 2. The ring 63 is of slightly smaller thickness than the width of the groove 61 and is formed so that it normally assumes a conical shape, and the overlapping ends 64 and 65, when forced into position provide a substantially tight fluid seal. When the ring 63 is in the slot 61 its resilience causes it to engage the top and bottom of the groove 61. Because of its conical form, it engages only the outer portion of the top of the groove and the inner portion of the bottom of the groove, the terms "inner" and "outer," as used here and in the claims, referring to the groove rather than the valve mechanism as a whole. The internal diameter of the ring 63 is normally slightly smaller than the external diameter of the skirt 58. Consequently, the ring 63 will frictionally engage the skirt 58, providing a substantially tight fluid seal until the configurated openings are elevated above the ring.

Since the ring 63 resiliently engages the top and bottom of the groove 61 as well as the skirt 58, it will frictionally resist relative movement of the skirt 58 and the valve disc 55 and, consequently, will dampen out any vibration of the valve disc and skirt. Furthermore, as the valve disc 55 moves towards its seat, the ring 63 will tend to be flattened to engage the skirt 58 more tightly.

The V ports 60 are adapted to cooperate with the ring 63 in determining the flow through the valve when the valve disc 55 is raised from the seat 54. The effective opening of the valve will be the area of the V ports 60 which lies above the inside edge of the ring 63. Since there is no clearance between the ring 63 and the skirt 58 until the configurated openings are elevated above the ring, the flow control will be much more accurate especially on very small valve openings than would be the case if the skirt 58 had the usual loose fit in the opening 52.

While one embodiment of my invention has been shown and described it will be understood that other forms are also contemplated which will be apparent to those skilled in the art. I am, therefore, to be limited only by the scope of the appended claims.

I claim as my invention:

1. In a valve, in combination, a valve body having inlet and outlet chambers, a partition separating said chambers having an opening therein and a groove in the surface of said partition, a valve seat surrounding the opening in said partition, a valve member positionable with said seat for closing the opening in said partition, valve member guiding means comprising a skirt with configurated openings extending into the opening in said partition, means for restricting the fluid flow and for dampening the vibration of the valve comprising a resilient split ring carried by the groove in said partition, said ring resiliently engaging the valve member guiding means.

2. In a valve, in combination, a valve body having inlet and outlet chambers, a partition separating said chambers having an opening therein and a groove in the inner surface of said partition, a valve seat surrounding the opening in said partition, a valve member positionable with said seat for closing the opening in said partition, valve member guiding means comprising a skirt with configurated openings extending into the opening in said partition, means for restricting the fluid flow and for dampening the vibration of the valve comprising a resilient split ring having overlapping ends carried by the groove in the opening in said partition and resiliently engaging the upper and lower surfaces of said groove, said ring resiliently engaging said guiding means, and providing a fluid seal until the configurated openings are elevated above the ring.

3. In a valve, in combination, a valve body having inlet and outlet chambers, a partition separating said chambers having an opening therein and a groove in the inner surface of said partition, a valve seat surrounding the opening in said partition, a valve member positionable with said seat for closing the opening in said partition, valve member guiding means comprising a skirt with V ports extending into the opening in said partition, means for restricting the fluid flow and for dampening the vibration of the valve comprising a resilient split ring having overlapping ends carried by the groove in the opening in said partition and resiliently engaging the upper and lower surfaces of said groove, said ring having substantially parallel upper and lower conical surfaces and being so disposed in said groove that one of said conical surfaces engages only the outer portion of said surfaces of the groove and the other of said conical surfaces engages only the inner portion of the other of said surfaces of the groove, said ring resiliently engaging said valve member guiding means, and providing a fluid seal until the V ports are elevated above the ring.

4. In a valve, in combination, a valve body having inlet and outlet chambers, a partition separating said chambers having an opening therein and a groove in the inner surface of said partition, a valve seat surrounding the opening in said partition, a valve member positionable with said seat for closing the opening in said partition, valve member guiding means comprising a skirt with configurated openings at the base thereof extending into the opening in said partition, means for restricting the fluid flow and for dampening the vibration of the valve comprising a resilient metal split ring having overlapping ends, carried by the groove in the opening in said partition and resiliently engaging the upper and lower surface of said groove, said ring having substantially parallel upper and lower conical surfaces and being so disposed in said groove that one of said conical surfaces engages only the outer portion of one of said surfaces of the groove and the other of said conical surfaces engages only the inner portion of the other of said surfaces of the groove, and said ring being further adapted to engage resiliently the outer surface of said valve guiding means, and providing a fluid seal until the configurated openings are elevated above the ring.

5. In a valve, in combination, a valve body having inlet and outlet chambers, a partition separating said chambers having an opening therein and a groove in the upper inner surface of said partition, a valve seat surrounding the opening in said partition, a valve member positionable with said seat for closing the opening in said partition, valve member guiding means comprising a skirt with configurated openings at the base thereof extending into the opening in said partition, means for restricting the fluid flow and for dampening the vibration of the valve comprising a resilient metal split ring having overlapping ends carried by the groove in the opening in said partition and resiliently engaging the upper and lower surface of said groove, said ring having substantially parallel upper and lower conical surfaces and being so disposed in said groove that one of said conical surfaces engages only the outer portion of one of said surfaces of the groove and the other of said conical surfaces engages only the inner portion of the other of said surfaces of the groove, and said ring being further adapted to engage resiliently the outer surface of said guiding means, providing a substantially tight fluid seal until the configurated openings are elevated above the ring.

DANIEL G. TAYLOR.